US010169488B2

(12) United States Patent
Long et al.

(10) Patent No.: US 10,169,488 B2
(45) Date of Patent: Jan. 1, 2019

(54) METHODS, SYSTEMS, AND MEDIA FOR PROVIDING SEARCH SUGGESTIONS BASED ON CONTENT RATINGS OF SEARCH RESULTS

(71) Applicant: Google LLC, Mountain View, CA (US)

(72) Inventors: Eileen Margaret Peters Long, San Jose, CA (US); James Lawry, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 436 days.

(21) Appl. No.: 14/628,056

(22) Filed: Feb. 20, 2015

(65) Prior Publication Data
US 2016/0246805 A1 Aug. 25, 2016

(51) Int. Cl.
G06F 17/30 (2006.01)
(52) U.S. Cl.
CPC ...... *G06F 17/3097* (2013.01); *G06F 17/3053* (2013.01); *G06F 17/30864* (2013.01)
(58) Field of Classification Search
None
See application file for complete search history.

(56) References Cited

U.S. PATENT DOCUMENTS

| | | | |
|---|---|---|---|
| 6,772,150 B1 * | 8/2004 | Whitman | G06F 17/30448 707/721 |
| 7,062,561 B1 * | 6/2006 | Reisman | G06F 17/30 707/E17.109 |
| 7,461,155 B2 * | 12/2008 | Reisman | G06F 17/30 707/E17.109 |
| 8,255,541 B2 * | 8/2012 | Reisman | G06F 17/30 709/203 |
| 8,412,728 B1 * | 4/2013 | Roskind | G06F 17/3064 707/767 |
| 8,577,913 B1 * | 11/2013 | Hansson | G06F 17/30 707/767 |

(Continued)

OTHER PUBLICATIONS

Eickhoff et al., "Web Search Query Assistance Functionality for Young Audiences", In Correct System Design, vol. 6611, Jan. 2011, pp. 776-779.

(Continued)

*Primary Examiner* — Farhan M Syed
(74) *Attorney, Agent, or Firm* — Byrne Poh LLP

(57) ABSTRACT

Methods, systems, and media for providing search suggestions are provided. In accordance with some embodiments, the method comprises: receiving user input that includes a partial search query; identifying a group of candidate search suggestions; determining whether each candidate search suggestion is included on a list of search suggestions that are prohibited, wherein the list is generated by: receiving previously submitted search queries and search results; determining, for each of the search queries, a number of search results associated with a particular content rating; determining whether the number meets a threshold value; and in response to determining that the number does not meet the threshold value, inserting the search query to the list; generating a modified group of search suggestions by removing search suggestions that are on the list; and causing a subset of the modified group of search suggestions to be presented as the remaining portion of the search query.

21 Claims, 5 Drawing Sheets

(56) References Cited

U.S. PATENT DOCUMENTS

| | | | | |
|---|---|---|---|---|
| 8,676,828 B1* | 3/2014 | Agarwal | ............. | G06F 17/2247 |
| | | | | 705/14.4 |
| 8,924,409 B1* | 12/2014 | Roskind | ............. | G06F 17/3064 |
| | | | | 707/767 |
| 9,454,621 B2* | 9/2016 | Angel | ................ | G06F 17/3097 |
| 9,477,782 B2* | 10/2016 | Marantz | ............. | G06F 17/3097 |
| 2006/0167862 A1* | 7/2006 | Reisman | ................ | G06F 17/30 |
| 2007/0100650 A1* | 5/2007 | Ramer | ............. | G06F 17/30749 |
| | | | | 705/26.1 |
| 2007/0100653 A1* | 5/2007 | Ramer | ............. | G06F 17/30749 |
| | | | | 705/1.1 |
| 2009/0024592 A1* | 1/2009 | Lazarski | ............. | G06F 17/3005 |
| 2011/0125764 A1* | 5/2011 | Carmel | ............ | G06F 17/30637 |
| | | | | 707/749 |
| 2013/0047260 A1* | 2/2013 | Hoefel | ............. | G06F 17/30867 |
| | | | | 726/27 |
| 2015/0186947 A1* | 7/2015 | Huang | ............... | G06Q 30/0269 |
| | | | | 705/14.66 |

OTHER PUBLICATIONS

International Search Report & Written Opinion of the International Search Authority dated Apr. 1, 2016 in International Patent Application PCT/US2016/012076.

International Preliminary Report on Patentability & Written Opinion dated Aug. 22, 2017 in International Patent Application No. PCT/US2016/012076.

Examination Report dated Jul. 9, 2018 in EP Patent Application No. 16702218.5.

* cited by examiner

ND MEDIA FOR
METHODS, SYSTEMS, AND MEDIA FOR PROVIDING SEARCH SUGGESTIONS BASED ON CONTENT RATINGS OF SEARCH RESULTS

TECHNICAL FIELD

The disclosed subject matter relates to methods, systems, and media for providing search suggestions.

BACKGROUND

Many children search for media content, such as videos, audio recordings, television programs, etc. on media playback devices. When a search query is in the process of being entered, potential search suggestions that may complete the search query can be presented. However, many parents do not want search suggestions that are directed to mature content to be presented to their children as the search query is being entered.

Accordingly, it is desirable to provide new methods, systems, and media for providing search suggestions.

SUMMARY

Methods, systems, and media for providing search suggestions are provided.

In accordance with some embodiments of the disclosed subject matter, a method for providing search suggestions is provided, the method comprising: receiving user input that includes one or more characters of a partial search query; identifying a group of candidate search suggestions corresponding to the one or more characters of the partial search query, wherein each candidate search suggestion is a prediction of a complete search query; determining whether each candidate search suggestion from the group of candidate search suggestions is included on a list of search suggestions that have been determined to be disallowed, wherein the list is generated by: receiving previously submitted search queries and a plurality of search results associated with each of the previously submitted search queries; determining, for each of the previously submitted search queries, a number of search results associated with a particular content rating; determining, for each of the previously submitted search queries, whether the number of search results associated with the particular content rating meets a predetermined threshold value; and in response to determining that the number of search results associated with the particular content rating does not meet the predetermined threshold value for the previously submitted search query, inserting the previously submitted search query to the list; generating, from the group of candidate search suggestions, a modified group of search suggestions by removing one or more search suggestions that are included on the list of search suggestions that have been determined to be disallowed; and causing a subset of the modified group of search suggestions to be presented on the user device as the remaining portion of the partial search query.

In accordance with some embodiments of the disclosed subject matter, a system for providing search suggestions is provided, the system comprising: a hardware processor that is programmed to: receive user input that includes one or more characters of a partial search query; identify a group of candidate search suggestions corresponding to the one or more characters of the partial search query, wherein each candidate search suggestion is a prediction of a complete search query; determine whether each candidate search suggestion from the group of candidate search suggestions is included on a list of search suggestions that have been determined to be disallowed, wherein the hardware processor is programmed to: receive previously submitted search queries and a plurality of search results associated with each of the previously submitted search queries; determine, for each of the previously submitted search queries, a number of search results associated with a particular content rating; determine, for each of the previously submitted search queries, whether the number of search results associated with the particular content rating meets a predetermined threshold value; and in response to determining that the number of search results associated with the particular content rating does not meet the predetermined threshold value for the previously submitted search query, insert the previously submitted search query to the list; generate, from the group of candidate search suggestions, a modified group of search suggestions by removing one or more search suggestions that are included on the list of search suggestions that have been determined to be disallowed; and cause a subset of the modified group of search suggestions to be presented on the user device as the remaining portion of the partial search query.

In accordance with some embodiments of the disclosed subject matter, a non-transitory computer-readable medium containing computer-executable instructions that, when executed by a processor, cause the processor to perform a method for providing search suggestions, is provided. The method comprises: receiving user input that includes one or more characters of a partial search query; identifying a group of candidate search suggestions corresponding to the one or more characters of the partial search query, wherein each candidate search suggestion is a prediction of a complete search query; determining whether each candidate search suggestion from the group of candidate search suggestions is included on a list of search suggestions that have been determined to be disallowed, wherein the list is generated by: receiving previously submitted search queries and a plurality of search results associated with each of the previously submitted search queries; determining, for each of the previously submitted search queries, a number of search results associated with a particular content rating; determining, for each of the previously submitted search queries, whether the number of search results associated with the particular content rating meets a predetermined threshold value; and in response to determining that the number of search results associated with the particular content rating does not meet the predetermined threshold value for the previously submitted search query, inserting the previously submitted search query to the list; generating, from the group of candidate search suggestions, a modified group of search suggestions by removing one or more search suggestions that are included on the list of search suggestions that have been determined to be disallowed; and causing a subset of the modified group of search suggestions to be presented on the user device as the remaining portion of the partial search query.

In accordance with some embodiments of the disclosed subject matter, a system for providing search suggestions is provided, the system comprising: means for receiving user input that includes one or more characters of a partial search query; means for identifying a group of candidate search suggestions corresponding to the one or more characters of the partial search query, wherein each candidate search suggestion is a prediction of a complete search query; means for determining whether each candidate search suggestion from the group of candidate search suggestions is included on a list of search suggestions that have been determined to be disallowed, wherein the list is generated by: receiving previously submitted search queries and a plurality of search results associated with each of the previously submitted search queries; means for determining, for each of the previously submitted search queries, a number of search results associated with a particular content rating; means for determining, for each of the previously submitted search queries, whether the number of search results associated with the particular content rating meets a predetermined threshold value; and in response to determining that the number of search results associated with the particular content rating does not meet the predetermined threshold value for the previously submitted search query, means for inserting the previously submitted search query to the list; means for generating, from the group of candidate search suggestions, a modified group of search suggestions by removing one or more search suggestions that are included on the list of search suggestions that have been determined to be disallowed; and means for causing a subset of the modified group of search suggestions to be presented on the user device as the remaining portion of the partial search query.

In some embodiments, each candidate search suggestion in the group of candidate search suggestions begins with the one or more characters of the partial search query.

In some embodiments, the system further comprises means for ranking the modified group of search suggestions, wherein the subset of the modified group of search suggestions is determined based on the ranking, and wherein the subset of the modified group of search suggestions is presented based on the ranking.

In some embodiments, the ranking is performed based at least in part on a relevance of search results associated with a search suggestion to a particular demographic.

In some embodiments, the system further comprises: means for determining a plurality of search queries from the group of previously submitted search queries that are similar; means for averaging the number of search results associated with the particular content rating for each of the plurality of search queries to calculate an updated number of search results; and in response to determining that the updated number of search results does not meet the predetermined threshold, means for inserting the plurality of search queries to the list.

In some embodiments, the system further comprises: means for determining whether each candidate search suggestion is on a second list of not allowed search suggestions, wherein the second list is associated with a user account authenticated on the user device; and means for removing search suggestions that are on the second list from the group of candidate search suggestions.

In some embodiments, the system further comprises: means for storing the number of search results associated with the particular content rating in association with each search query in the list; and means for storing the list.

In some embodiments, the means for receiving the previously submitted search queries and the plurality of search results associated with each of the previously submitted search queries further comprises means for identifying the plurality of search results associated with each of the previously submitted search queries.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
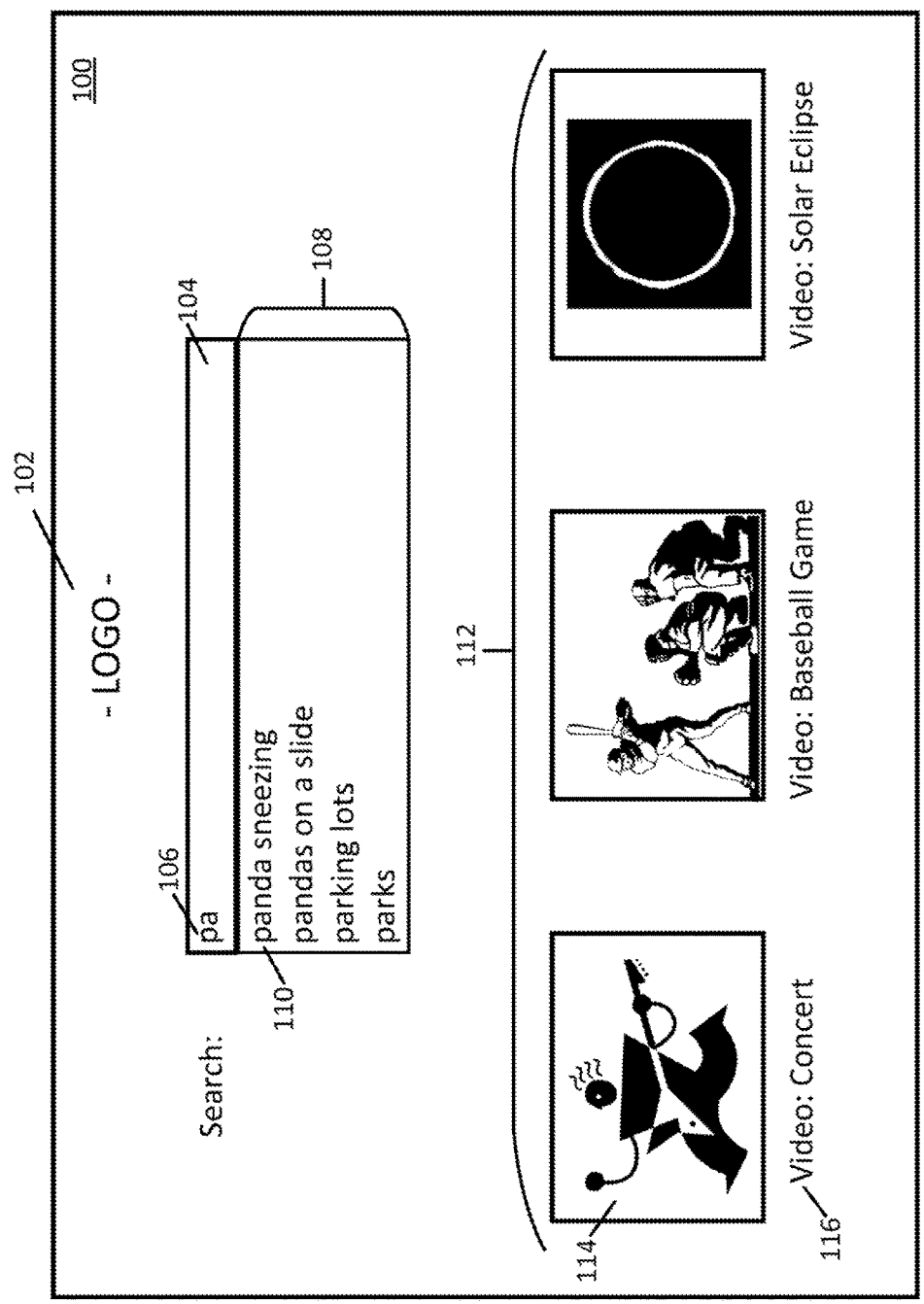
FIG. 1 shows an example of a user interface for presenting search suggestions in accordance with some embodiments of the disclosed subject matter.

In accordance with various embodiments, mechanisms (which can include methods, systems, and media) for providing search suggestions are provided.

In some embodiments, the mechanisms can receive user input that includes one or more characters of a partial search query entered on a user device, and can determine candidate search suggestions corresponding to the received characters. In some embodiments, the candidate search suggestions can each be predictions of a complete search query. For example, in some embodiments, each of the candidate search suggestions can complete a word and/or a phrase beginning with or containing the received characters. The mechanisms can then determine whether each candidate search suggestion is suitable for presentation on the user device prior to receiving the user input of the complete query. For example, in some embodiments, the mechanisms can determine whether a candidate search suggestion is suitable for presentation to children of a particular age. The mechanisms can remove search suggestions that are determined to not be suitable for presentation, and can cause a subset of the allowed candidate search suggestions to be presented on the user device.

In some embodiments, the mechanisms can determine whether a candidate search suggestion is suitable for presentation based on whether or not the search suggestion is included in one or more lists of search queries that are not to be presented. In some embodiments, the list can be generated based on manual input from a human. For example, in some embodiments, the manually inputted list can include words and/or phrases (e.g., entered by a parent of a child) that are not to be included in search suggestions, topics and/or types of content (e.g., violence, sexual content, profanity, drug use, and/or any other suitable types of content) that are associated with search suggestions that are not to be presented, and/or any other suitable input. Additionally or alternatively, in some embodiments, the list can be generated based on a number and/or a proportion of search results returned from previously submitted search queries that are associated with content of a particular rating. For example, in some embodiments, previously submitted search queries that generate less than a predetermined number and/or proportion of search results associated with a particular content rating can be included in the list of search queries that are not to be presented. As a specific example, in some embodiments, search queries associated with search results where fewer than 30% of the search results are associated with content that is rated as being suitable for all ages can be included in the list.

In some embodiments, the candidate search suggestions can be ranked before the subset of candidate search suggestions are presented. For example, in some embodiments, the allowed candidate search suggestions can be ranked after search suggestions determined to not be suitable for presentation are removed, and the subset of presented search suggestions can be determined based on the ranking. In some embodiments, the candidate search suggestions can be ranked based on any suitable information, such as relevance of the search suggestion to a particular demographic (e.g., children, children of a particular age range, and/or any other suitable demographic).

It should be noted that, although the embodiments described herein relate to video content and presenting search suggestions when searching through a corpus of video content, the mechanisms described herein can be used to present search suggestions when searching through any suitable corpus. For example, in some embodiments, the corpus can include audio content (e.g., music, radio programs, audiobooks, and/or any other suitable content), games, electronic documents (e.g., emails, e-books, and/or any other suitable electronic documents), and/or any other suitable corpus of content.

Turning to FIG. 1, an example 100 of a user interface for presenting search suggestions in accordance with some embodiments of the disclosed subject matter is shown. As illustrated, user interface 100 can include a logo 102, a search text input 104, a portion of a search query 106, a group of search suggestions 108, and page content 112. User interface 100 can be presented on any suitable user device, such as a mobile phone, a tablet computer, a laptop computer, a desktop computer, a wearable computer, and/or any other suitable user device.

Logo 102 can be any suitable logo associated with a provider of user interface 100. In some embodiments, logo 102 can include any suitable text, images, icons, graphics, animations, and/or any other suitable content. Note that the position of logo 102 in user interface 100 is shown as an example, and logo 102 can be presented in any suitable location. In some embodiments, logo 102 can be omitted.

Search text input 104 can be any suitable user interface control for receiving a search query from the user device. For example, as shown in FIG. 1, search text input 104 can include a text input box, which can receive text from any suitable source, such as a keyboard, a touchscreen keypad, a microphone, and/or any other suitable source.

Partial search query 106 can be any suitable portion of a search query. For example, as shown in FIG. 1, partial search query 106 can include any suitable subset of a word and/or phrase. In some embodiments, partial search query 106 can include any suitable number (e.g., one, two, five, ten, and/or any other suitable number) of letters and/or characters.

Group of search suggestions 108 can be any suitable group of search suggestions determined to be suitable for presentation, for example, as described below in connection with FIG. 4. Group of search suggestions 108 can include any suitable number (e.g., zero, one, two, five, ten, and/or any other suitable number) of search suggestions. In some embodiments, an individual suggestion in group of search suggestions 108, such as search suggestion 110, can be any suitable search suggestion that begins with portion of search query 106. As a specific example, if portion of a search query 106 is the group of characters "pa," search suggestion 110 can include any suitable word or phrase that begins with the characters "pa," such as "panda sneezing." As another example, in some embodiments, an individual suggestion can be a search suggestion that includes the portion of text at any position within the search suggestion. As a specific example, if portion of a search query 106 is the group of characters "pa," search suggestions 110 can include words and/or phrases that include the characters "pa," such as "sneezing panda," and/or any other suitable words and/or phrases.

Page content 112 can include any other suitable content associated with user interface 100. For example, as shown in FIG. 1, in instances where user interface 100 is associated with a site that stores and/or streams videos to user devices, page content 112 can include links to videos available for viewing. As a more particular example, in some embodiments, a link to a video available for viewing can include a video image 114 and/or a video title 116. In some such embodiments, selection of video image 114 and/or video title 116 can cause an associated video to begin being presented. Page content 112 can include any suitable text, images, icons, animations, videos, hyperlinks, and/or any other suitable content. In some embodiments, page content 112 can be omitted.

Figure 2:
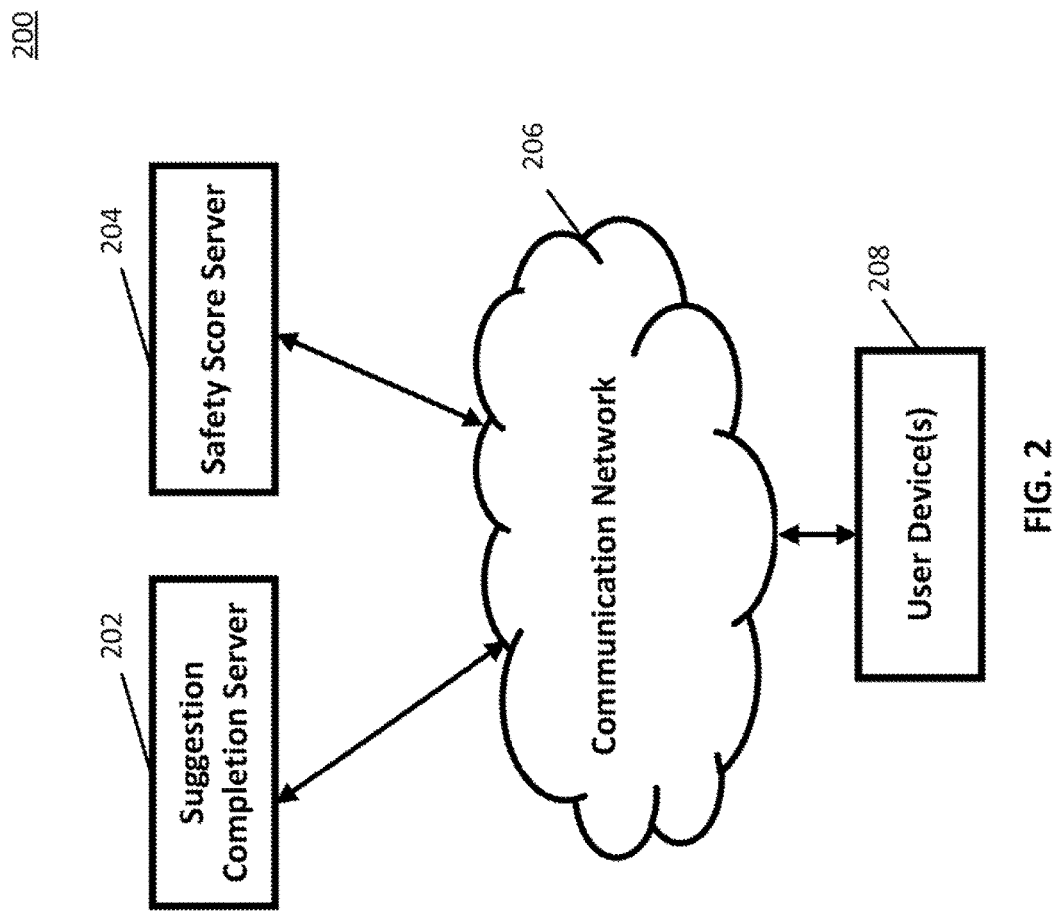
FIG. 2 shows a schematic diagram of an example of a system for presenting search suggestions in accordance with some embodiments of the disclosed subject matter.

Turning to FIG. 2, an example 200 of hardware for providing search suggestions that can be used in accordance with some embodiments of the disclosed subject matter is shown. As illustrated, hardware 200 can include one or more servers, such as a suggestion completion server 202 and a safety score server 204, a communication network 206, and one or more user devices 208.

Suggestion completion server 202 can be any suitable server for receiving a portion of a search query, identifying a group of candidate search suggestions to complete the remaining portion of the search query, and removing search suggestions from the group of candidate search suggestions that are determined to not be suitable for presentation in some embodiments. As a more particular example, in some embodiments, suggestion completion server 202 can identify the group of candidate search suggestions, and can request an indication of whether each search suggestion is the group is to be allowed to be presented from safety score server 204, as described below in connection with FIG. 4. In some embodiments, after removing search suggestions determined to not be allowed to be presented, suggestion completion server 202 can cause a subset of the search suggestions to be presented on user device 208, as described below in connection with FIG. 4. In some embodiments, suggestion completion server 202 can be omitted.

Safety score server 204 can be any suitable server for creating and/or storing a list of search suggestions that are not to be presented. For example, as shown in and described below in connection with FIG. 5, safety score server 204 can create the list by receiving previous search queries (e.g., from multiple user devices and/or over multiple days), determining a number of search results associated with a particular content rating (e.g., suitable for children of all ages, suitable for older children, suitable for adults, and/or any other suitable content rating), and adding a search query to the list if the number of search results associated with the content rating is below a predetermined threshold. As another example, in some embodiments, the list can be manually created (e.g., by a human), and stored on safety score server 204. In some embodiments, safety score server 204 can be omitted.

Communication network 206 can be any suitable combination of one or more wired and/or wireless networks in some embodiments. For example, communication network 106 can include any one or more of the Internet, a mobile data network, a satellite network, a local area network, a wide area network, a telephone network, a cable television network, a WiFi network, a WiMax network, and/or any other suitable communication network.

User device(s) 208 can include any one or more user devices suitable for entering search queries and/or presenting search suggestions. For example, in some embodiments, user device(s) 208 can include mobile devices, such as a mobile phone, a tablet computer, a laptop computer, a vehicle (e.g., a car, a boat, an airplane, or any other suitable vehicle) entertainment system, a portable media player, or any other suitable mobile device. As another example, in some embodiments, user device(s) 208 can include non-mobile devices such as a desktop computer, a set-top box, a television, a streaming media player, a game console, or any other suitable non-mobile device.

Although suggestion completion server 202 and safety score server 204 are illustrated as separate devices, any one or more of these devices can be combined into one device in some embodiments. Also, although only one each of suggestion completion server 202 and safety score server 204 are shown in FIG. 2 to avoid over-complicating the figure, any suitable one or more of each device can be used in some embodiments.

Although only one user device 208 is shown in FIG. 2 to avoid over-complicating the figure, any suitable number of each of these devices, and any suitable types of these devices, can be used in some embodiments.

Figure 3:
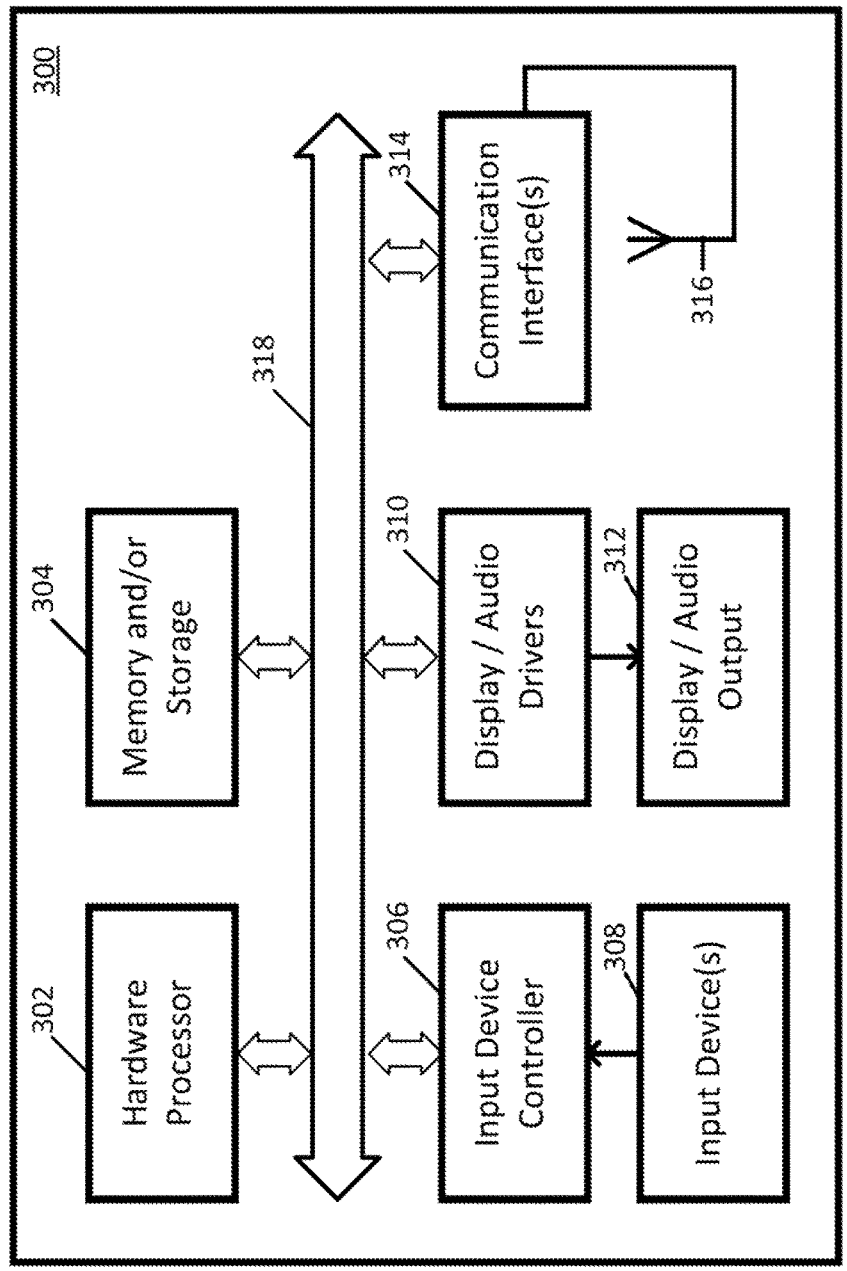
FIG. 3 shows an example of hardware that can be used in a server and/or a user device in accordance with some embodiments of the disclosed subject matter.

Suggestion completion server 202, safety score server 204, and user device 208 can be implemented using any suitable hardware in some embodiments. For example, in some embodiments, devices 202, 204, and 208 can be implemented using any suitable general purpose computer or special purpose computer. For example, a server may be implemented using a special purpose computer. Any such general purpose computer or special purpose computer can include any suitable hardware. For example, as illustrated in example hardware 300 of FIG. 3, such hardware can include hardware processor 302, memory and/or storage 304, an input device controller 306, an input device 308, display/audio drivers 310, display and audio output circuitry 312, communication interface(s) 314, an antenna 316, and a bus 318.

Hardware processor 302 can include any suitable hardware processor, such as a microprocessor, a micro-controller, digital signal processor(s), dedicated logic, and/or any other suitable circuitry for controlling the functioning of a general purpose computer or a special purpose computer in some embodiments.

Memory and/or storage 304 can be any suitable memory and/or storage for storing programs, data, media content, and/or any other suitable information in some embodiments. For example, memory and/or storage 304 can include random access memory, read-only memory, flash memory, hard disk storage, optical media, and/or any other suitable memory.

Input device controller 306 can be any suitable circuitry for controlling and receiving input from one or more input devices 308 in some embodiments. For example, input device controller 306 can be circuitry for receiving input from a touch screen, from one or more buttons, from a voice recognition circuit, from a microphone, from a camera, from an optical sensor, from an accelerometer, from a temperature sensor, from a near field sensor, and/or any other type of input device.

Display/audio drivers 310 can be any suitable circuitry for controlling and driving output to one or more display/audio output circuitries 312 in some embodiments. For example, display/audio drivers 310 can be circuitry for driving an LCD display, a speaker, an LED, or any other type of output device.

Communication interface(s) 314 can be any suitable circuitry for interfacing with one or more communication networks, such as network 206 as shown in FIG. 2. For example, interface(s) 314 can include network interface card circuitry, wireless communication circuitry, and/or any other suitable type of communication network circuitry.

Antenna 316 can be any suitable one or more antennas for wirelessly communicating with a communication network in some embodiments. In some embodiments, antenna 316 can be omitted when not needed.

Bus 318 can be any suitable mechanism for communicating between two or more components 302, 304, 306, 310, and 314 in some embodiments.

Any other suitable components can be included in hardware 300 in accordance with some embodiments.

Figure 4:
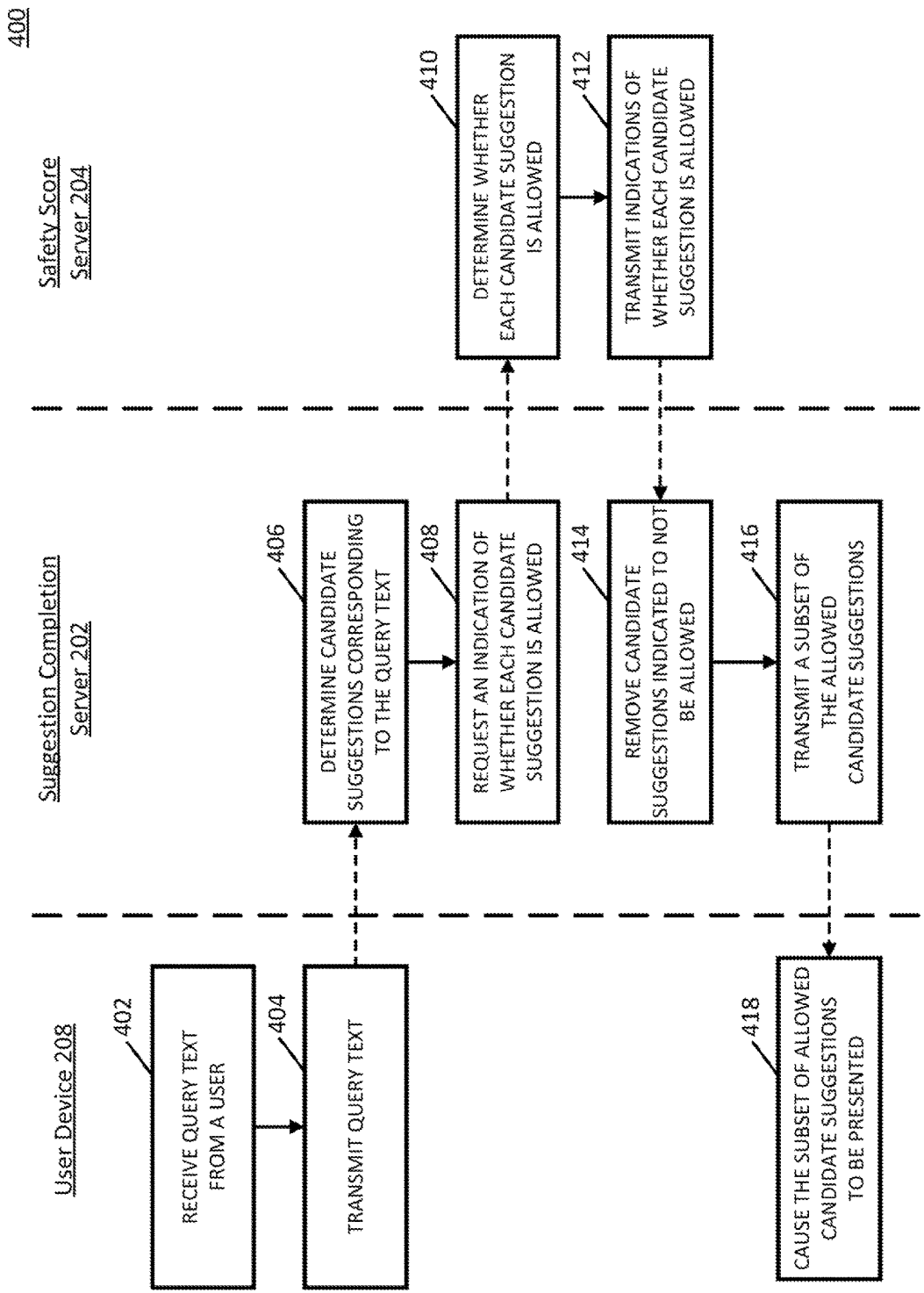
FIG. 4 shows an example of an information flow diagram for providing search suggestions in accordance with some embodiments of the disclosed subject matter.

Turning to FIG. 4, an example 400 of an information flow diagram for presenting search suggestions is shown in accordance with some embodiments of the disclosed subject matter. In some embodiments, information flow diagram 400 can be implemented on user device 208, suggestion completion server 202, and safety score server 204.

At 402, user device 208 can receive a portion of text associated with a search query. As shown in and described above in connection with FIG. 1, the portion of text can include any suitable number (e.g., one, two, five, ten, and/or any other suitable number) of characters. The text can be entered on user device 208 in any suitable manner, for example, through a keyboard, a touchscreen keypad, speech recognition used in connection with a microphone of user device 208, and/or any other suitable manner.

User device 208 can transmit the received portion of text at 404 to suggestion completion server 202. Note that the transmitted portion of text can be transmitted to suggestion completion server 202 at any suitable time after text entry has started and before a full search query has been entered. For example, in some embodiments, user device 208 can transmit the received text after a particular number of characters have been received and/or after a particular duration of time (e.g., one second, two seconds, ten seconds, and/or any other suitable time) has elapsed since text entry started.

At 406, suggestion completion server 202 can identify candidate search suggestions corresponding to the received portion of search query text. For example, in some embodiments, suggestion completion server 202 can identify words and/or phrases that begin with the received portion of text. As a specific example, if the received portion of text is the characters "pa," suggestion completion server 202 can identify words and/or phrases that begin with "pa," such as "panda," "panda sneezing," "panic," "parking lots," and/or any other suitable words and/or phrases. As another example, in some embodiments, suggestion completion server 202 can identify words and/or phrases that include the received portion of text in any position. As a specific example, if the received portion of text is the characters "pa," suggestion completion server 202 can identify words and/or phrases that include the characters "pa," such as "sneezing panda," and/or any other suitable words and/or phrases.

Suggestion completion server 202 can identify the candidate search suggestions using any suitable technique or combination of techniques. For example, in some embodiments, suggestion completion server 202 can identify the candidate search suggestions by querying a database for words and/or phrases that begin with the received portion of search query text. In some such embodiments, the database can be associated with any suitable topic and/or genre, such as media content (e.g., metadata associated with movies, videos, audio content, audiobooks, television programs, and/or any other suitable media content). In some embodiments, suggestion completion server 202 can identify any suitable number (e.g., ten, fifty, hundred, thousand, and/or any other suitable number) of candidate search suggestions.

Suggestion completion server 202 can request an indication of whether each of the candidate search suggestions is allowed to be presented on user device 208 (e.g., in group of search suggestions 108 as shown in and described above in connection with FIG. 1) at 408. In some embodiments, suggestion completion server 202 can transmit the request to safety score server 204 via communication network 206. In some embodiments, the request can include any suitable information, such as text corresponding to each of the candidate search suggestions. Additionally, in some embodiments, the request can include an indication of a content rating to be used by safety score server 204 to determine if a search suggestion is to be allowed. For example, in some embodiments, the content rating can indicate a minimum age (e.g., zero, five, ten, and/or any other suitable age) of a child to view an associated item of media content.

At 410, safety score server 204 can determine whether each of the candidate search suggestions is to be allowed to be presented using any suitable technique or combination of techniques. For example, in some embodiments, safety score server 204 can determine whether the candidate search suggestion and/or a word included in the candidate search suggestion is included in a list of words and/or phrases that are not to be presented. In some embodiments, the list of words and/or phrases that are not to be presented can be generated in any suitable manner. For example, in some embodiments, the list of words and/or phrases can be created manually, that is, by a human adding objectionable words and/or phrases. As another example, in some embodiments, the list of words and/or phrases can be generated based on an evaluation of the type of content associated with search results retrieved from a search using the candidate search suggestion, as shown in and described below in connection with FIG. 5. Note that, in some embodiments, more than one list of words and/or phrases that are not to be presented can be stored on safety score server 204, such as a manually created list and a list generated based on content associated with search results. In some such embodiments, safety score server 204 can determine whether a candidate search suggestion and/or a word included in the candidate search suggestion is included in any suitable combination of the multiple lists (e.g., included in any of the lists, included in all of the lists, and/or any other suitable combination).

Safety score server 204 can transmit, to suggestion completion server 202, indications of whether each candidate search suggestion is allowed to be presented at 412 using any suitable technique or combination of techniques. For example, in some embodiments, safety score server 204 can transmit a list of candidate search suggestions that are not to be allowed. As another example, in some embodiments, safety score server 204 can transmit a list of candidate search suggestions that are to be allowed. As yet another example, in some embodiments, safety score server 204 can transmit an indication of a safety score, calculated as described below in connection with FIG. 5, associated with each of the candidate search suggestions.

At 414, suggestion completion server 202 can remove candidate search suggestions indicated to not be allowed to be presented from the group of candidate search suggestions. In instances where safety score server 204 transmits a list of allowed or not allowed search suggestions, suggestion completion server 202 can update the group of candidate search suggestions based on the received list. In instances where safety score server 204 transmits a safety score associated with each of the candidate search suggestions, suggestion completion server 202 can filter the group of candidate search suggestions based on the received safety score. For example, in some embodiments, suggestion completion server 202 can remove any search suggestions with safety scores below a predetermined threshold.

Note that, in some embodiments, suggestion completion server 202 can receive information indicating particular search queries that have been blocked (e.g., based on content ratings associated with search results retrieved based on the search query). In some such embodiments, suggestion server 202 can additionally remove one or more search suggestions in the group of candidate search suggestions that appear in a group of blocked search queries. Additionally or alternatively, the received information can indicate a level of uncertainty relating to safety of particular search queries (e.g., that there is a 70% chance that they should be blocked, and/or any other suitable indication of uncertainty), and suggestion server 202 can remove any search suggestions from the group of candidate search suggestions that are associated with more than a particular level of uncertainty. In some embodiments, whether a particular search query is to be blocked can be determined using any suitable technique(s) and information from any suitable time period (e.g., search logs from the past day, from the past ten days, and/or any other suitable time period).

Suggestion completion server 202 can transmit a subset of the allowed candidate suggestions to user device 208 at 416. The subset can include any suitable number (e.g., zero, one, five, ten, and/or any other suitable number) of search suggestions. Suggestion completion server 202 can select the subset based on any suitable information and using any suitable technique(s). For example, in some embodiments, suggestion completion server 202 can rank the allowed candidate suggestions based on any suitable information, such as relevance to a particular topic, relevance to a particular demographic group (e.g., children within a particular age range, and/or any other suitable demographic group), popularity of the search query and/or search results associated with the query (e.g., based on a number of times a particular query has been entered, a number of times a particular search result has been viewed, and/or any other suitable metric) and/or any other suitable information. As another example, in some embodiments, suggestion completion server 202 can rank the allowed candidate suggestions based on relevance of associated content items to a particular topic, demographic group, and/or any other suitable information. Suggestion completion server 202 can then select any suitable number (e.g., one, two, five, ten, and/or any other suitable number) of the ranked candidate suggestions.

Note that, in some embodiments, prior to ranking and/or selection of the subset of allowed candidate suggestions, suggestions completion server 202 can apply one or more weights to search suggestions in any suitable manner. For example, in some embodiments, search suggestions can be weighted based on popularity of the search query and/or popularity of search results associated with the search query. As a more particular example, in some embodiments, search suggestions associated with search queries that are more frequently entered can be weighted more heavily than search queries that are less frequently entered. As another more particular example, in some embodiments, search suggestions associated with search results that have been viewed more times and/or viewed more recently can be weighted more heavily than search suggestions associated with search results that have been viewed fewer times and/or less recently. As another example, in some embodiments, search suggestions can be weighted based on a number of search results associated with the search query that are associated with a particular content rating (e.g., suitable for all ages, determined to be of interest to children, and/or any other suitable content rating). As a more particular example, in some embodiments, a search suggestion that would produce more search results indicated as suitable for all ages can be weighted more heavily than a search suggestion that produces fewer search results indicated as suitable for all ages. Additionally or alternatively, in some embodiments, a search result that produces fewer than a predetermined number (e.g., one, two, five, and/or any other suitable number) of search results associated with a particular content rating can be removed. In some embodiments, the weighted search suggestions can be used to rank the search suggestions and/or select the subset of search suggestions, as described above in connection with block 416 of FIG. 4.

At 418, user device 208 can cause the subset of allowed search suggestions to be presented in any suitable manner. For example, as shown in FIG. 1, the subset of allowed search suggestions can be presented in association with a text input interface used to receive the search query. In some embodiments, the presented search suggestions can be selectable, and selection of a particular search suggestion can cause the text of the search suggestion to be presented within the text input interface. Note that, in some embodiments, any search suggestions in the subset of allowed search suggestions that produce no search results and/or no search results associated with a particular content rating (e.g., suitable for all ages) can be removed from the subset of allowed search suggestions and therefore, not presented. Furthermore, in instances where all of the search suggestions in the subset of allowed search suggestions produce no search results and/or no search results associated with a particular content rating, user device 208 can cause zero search suggestions to be presented.

Note that, in some embodiments, a list used to determine if particular search suggestions are allowed to be presented can be created based on input from a user, such as a user associated with user device 208. For example, in some embodiments, the user can specify particular words and/or phrases that are not to be included in search suggestions, particular topics that are not to be associated with search suggestions, and/or any other suitable information. As a more particular example, in some embodiments, the user can specify that search suggestions that include words and/or phrases associated with a particular topic, genre, and/or category of objectionable content (e.g., violence, sexual content, drug use, profanity, a particular news event, and/or any other category and/or topic) are not to be presented. In some such embodiments, the list can be stored on any suitable device, including user device 208, suggestion completion server 202, and/or safety score server 204. In instances where the list is stored on a server, the list can be stored in association with a user account authenticated on user device 208. In instances where the list is stored on user device 208, the subset of search suggestions transmitted by suggestion completion server 202 at block 416 can be filtered using the list before the search suggestions are presented on user device 208.

Figure 5:
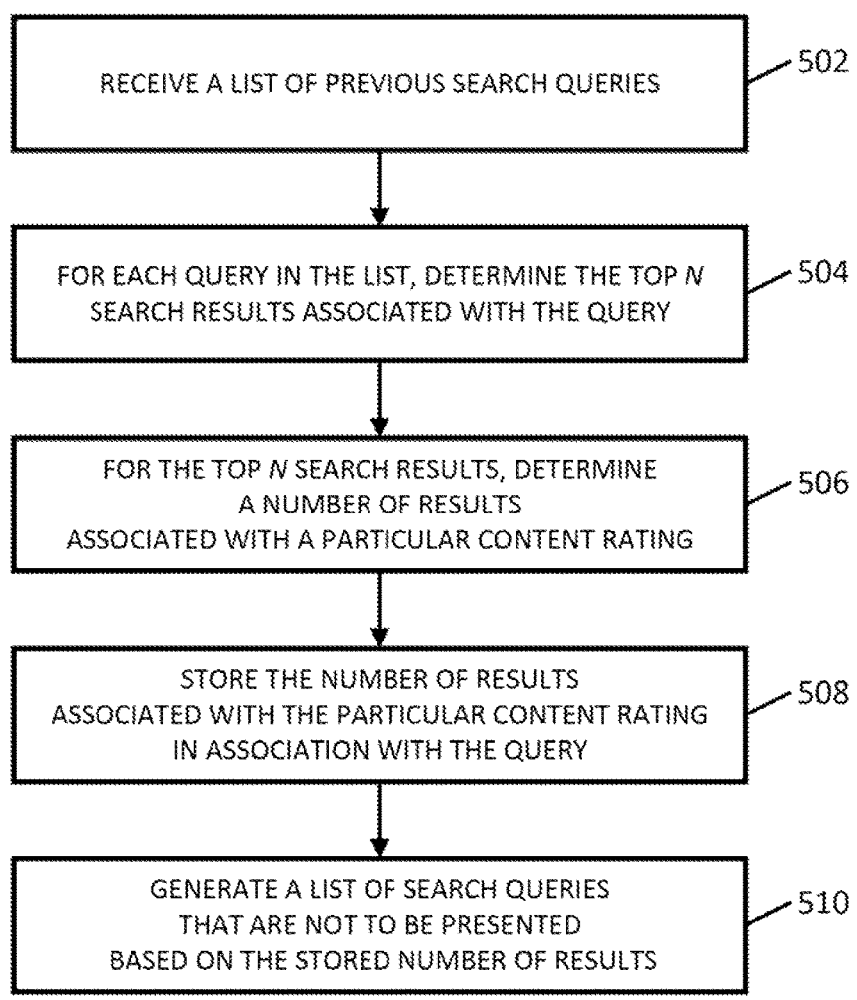
FIG. 5 shows an example of a process for creating a list of search suggestions that are not to be presented in accordance with some embodiments of the disclosed subject matter.

Turning to FIG. 5, an example 500 of a process for generating a list of search suggestions that are not allowed to be presented is shown in accordance with some embodiments of the disclosed subject matter.

Process 500 can begin by receiving a group of previously submitted search queries at 502. The group of previously submitted search queries can include queries received from multiple user devices and over any suitable time period (e.g., previously submitted queries from the past day, previously submitted queries from the past week, previously submitted queries from the past month, and/or any other suitable time period). For example, in some embodiments, the group of previously submitted search queries can correspond to a search log from any suitable time period (e.g., the previous day, the previous two days, the previous ten days, the previous thirty days, and/or any other suitable time period), and can indicate the previously submitted queries received during the time period and their corresponding search results. Additionally, the group of previously submitted search queries can include unfiltered queries directed to any suitable source, service provider, database, and/or any other suitable entity. For example, in some embodiments, the group of previously submitted search queries can correspond to queries to a web site that hosts and/or streams video content. As another example, in some embodiments, the group of previously submitted search queries can correspond to queries to a database that lists information (e.g., a title, a content rating, names of actors, a synopsis, and/or any other suitable information) relating to media content items.

Additionally or alternatively to receiving previously submitted search queries, in some embodiments, process 500 can receive live data indicating search queries and returned search results over any suitable recent time period (e.g., the previous second, the previous ten seconds, the previous minute, and/or any other suitable time period). In some embodiments, the live data can be received from any suitable source, such as search suggestion server 202.

Process 500 can determine, for each search query in the group of previously submitted search queries, the top N (e.g., five, ten, twenty, hundred, thousand, and/or any other suitable number) search results associated with the search query at 504. Process 500 can determine the top N search results using any suitable technique or combination of techniques. For example, in some embodiments, process 500 can use an associated search engine to access search results resulting from a search query and can store the top N results.

In some embodiments, each of the N search results can be associated with a content rating. For example, in instances where a search result is associated with an item of media content, the content rating can indicate whether the media content item includes particular types of content (e.g., sexual content, violence, profanity, and/or any other types of content), suggested minimum ages (e.g., suitable for all ages, suitable for children over a particular age, suitable for adults, and/or any other suitable ages and/or age ranges) to view the content, and/or any other suitable information. In some embodiments, the content rating can be associated with any suitable content rating system (e.g., a content rating system used by a particular country, a content rating system applied to particular types of content, such as movies, video games, television programs, etc., and/or any other suitable type of content rating system).

At 506, process 500 can, for each search query in the group of previously submitted search queries, determine a number of search results from the top N search results that are associated with one or more particular content ratings. For example, in some embodiments, the content rating(s) can indicate that the content is suitable for all ages and/or that the content is targeted at children. As another example, in some embodiments, the particular content rating(s) can indicate that the content is only suitable for adults. Process 500 can determine the number of search results associated with the particular content rating(s) using any suitable technique(s). For example, in some embodiments, process 500 can determine a media content item associated with a particular search result, and can then determine the content rating associated with the media content item. Process 500 can then update a tally of how many media content items are associated with each content rating in a group of content ratings (e.g., how many of the search results/media content items are suitable for all ages, and/or any other suitable content rating).

Note that, in some instances, a particular query can appear multiple times in the group of search queries, either as an exact match, or as a similar query (e.g., as a common misspelling, using a synonym for one or more words, and/or in any other suitable manner). In some embodiments, process 500 can identify queries that are similar and/or the same, and can aggregate the number of search results associated with the particular content rating(s) across the identified queries. For example, in some embodiments, process 500 can average numbers of results associated with the particular content rating across queries determined to be the same and/or similar. As another example, in some embodiments, process 500 can calculate the minimum and/or the maximum number of results associated with the particular content rating across queries determined to be the same and/or similar.

Process 500 can, for each search query in the group of previously submitted search queries, store the number of results associated with the particular content rating(s) in association with the search query at 508. As a specific example, if process 500 determines at block 506 that a search query is associated with 50 search results that are associated with a content rating indicating that the content is suitable for all ages, process 500 can store the number 50 in association with the search query. In some embodiments, process 500 can store the number of results in a manner that indicates a proportion of the search results that are associated with the particular content rating(s). Continuing with the previous specific example, if N is 100 (that is, 100 search results were identified at block 504), process 500 can store the value 0.5 in association with the search query, indicating that 50% of the search results are suitable for all ages. Note that, in some embodiments, the number of results associated with the particular content rating(s) can be used as a safety score, which can be used by suggestion completion server 202 to filter candidate search suggestions, as described above in connection with block 414 of FIG. 4

Process 500 can generate a list of search queries that are not to be presented based on the stored number of results at 510 using any suitable technique or combination of techniques. For example, in some embodiments, the list can include search queries associated with a number of search results associated with a particular content rating that is below a predetermined threshold. As a specific example, if the content rating indicates that the content is suitable for all ages, the list can include search queries where the number of search results associated with content that is indicated as suitable for all ages is below a predetermined threshold (e.g., less than 50 search results, less than 50% of the search results, and/or any other suitable number and/or proportion). As another example, in some embodiments, the list can include search queries associated with a number of search results associated with a particular content rating that is greater than a predetermined threshold. As a specific example, if the content rating indicates that the content is only suitable for adults, the list can include search queries where the number of search results associated with content that is indicated as only suitable for adults is greater than a predetermined threshold (e.g., more than 50 search results, more than 50% of the search results, and/or any other suitable number and/or proportion). Note that, in some embodiments, process 500 can store the number of search results associated with the particular content rating in association with each search query in the list.

In some embodiments, process 500 can cause the list to be stored in any suitable location, such as memory 304 of suggestion completion server 202 and/or safety score server 204. The list generated by process 500 at block 510 can then be used by process 400 to determine whether candidate search suggestions are allowed to be presented, for example, as described above in connection with block 410 of FIG. 4.

Note that, in some embodiments, the list of search queries can include all of the search queries in the group of search queries received at block 502, and the list of search queries can include a ranking of the search queries based on the number of search results associated with a particular content rating. For example, in some embodiments, search queries associated with a larger number of search results corresponding to content that is indicated as suitable for all ages can be ranked higher than search queries associated with a smaller number of search results corresponding to content that is indicated as suitable for all ages. Additionally or alternatively, in some embodiments, process 500 can generate the list of search queries such that some search queries (e.g., those associated with a number of search results corresponding to content that is indicated as suitable for all ages that is below a predetermined threshold) are not on the list, and where the search queries that are in the list are ranked, for example, based on the number of search results associated with a particular content rating. In some such embodiments, the relative rankings of search queries in the list can be used by 400 to determine which candidate search suggestions are allowed to be presented. For example, in some embodiments, process 400 can determine that only search queries in a particular percentile range are to be presented as search suggestions.

It should be understood that at least some of the above described blocks of the processes of FIGS. 4 and 5 can be executed or performed in any order or sequence not limited to the order and sequence shown in and described in the figure. Also, some of the above blocks of the processes of FIGS. 4 and 5 can be executed or performed substantially simultaneously where appropriate or in parallel to reduce latency and processing times. Additionally or alternatively, some of the above described blocks of the processes of FIGS. 4 and 5 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described here collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for providing search suggestions are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for providing search suggestions, comprising:
receiving user input from a user device that includes one or more characters of a partial search query;
identifying a group of candidate search suggestions corresponding to the one or more characters of the partial search query, wherein each candidate search suggestion is a prediction of a complete search query;
determining whether each candidate search suggestion from the group of candidate search suggestions is included on a list of search suggestions that have been determined to be disallowed, wherein the list is generated by:
receiving previously submitted search queries from user devices other than the user device and a plurality of search results that have been previously retrieved by a search engine in response to each of the previously submitted search queries;
determining, for each of the previously submitted search queries received from the user devices other than the user device, a number of search results retrieved in response to the submitted search query that include content associated with a particular content rating, wherein the particular content rating indicates a suggested age for viewers of content associated with the particular content rating;
determining, for each of the previously submitted search queries, whether the number of search results associated with the particular content rating meets a predetermined threshold value; and
in response to determining that the number of search results associated with the particular content rating does not meet the predetermined threshold value for the previously submitted search query, inserting the previously submitted search query to the list;
generating, from the group of candidate search suggestions, a modified group of search suggestions by removing one or more search suggestions that are included on the list of search suggestions that have been determined to be disallowed; and
causing a subset of the modified group of search suggestions to be presented on the user device as the remaining portion of the partial search query.

2. The method of claim 1, wherein each candidate search suggestion in the group of candidate search suggestions begins with the one or more characters of the partial search query.

3. The method of claim 1, further comprising ranking the modified group of search suggestions, wherein the subset of the modified group of search suggestions is determined based on the ranking, and wherein the subset of the modified group of search suggestions is presented based on the ranking.

4. The method of claim 3, wherein the ranking is performed based at least in part on a relevance of search results associated with a search suggestion to a particular demographic.

5. The method of claim 1, further comprising:
determining a plurality search queries from the group of previously submitted search queries that are similar;
averaging the number of search results associated with the particular content rating for each of the plurality of search queries to calculate an updated number of search results; and
in response to determining that the updated number of search results does not meet the predetermined threshold, inserting the plurality of search queries to the list.

6. The method of claim 1, further comprising:
determining whether each candidate search suggestion is on a second list of not allowed search suggestions, wherein the second list is associated with a user account authenticated on the user device; and
removing search suggestions that are on the second list from the group of candidate search suggestions.

7. The method of claim 1, further comprising:
storing the number of search results associated with the particular content rating and a safety score based on the number of search results associated with the particular content rating in association with each search query in the list; and
storing the list.

8. A system for providing search suggestions, the system comprising:
a hardware processor that is programmed to:
receive user input from a user device that includes one or more characters of a partial search query;
identify a group of candidate search suggestions corresponding to the one or more characters of the partial search query, wherein each candidate search suggestion is a prediction of a complete search query;

determine whether each candidate search suggestion from the group of candidate search suggestions is included on a list of search suggestions that have been determined to be disallowed, wherein the hardware processor is programmed to:
receive previously submitted search queries from user devices other than the user device and a plurality of search results that have been previously retrieved by a search engine in response to each of the previously submitted search queries;
determine, for each of the previously submitted search queries received from the user devices other than the user device, a number of search results retrieved in response to the submitted search query that include content associated with a particular content rating, wherein the particular content rating indicates a suggested age for viewers of content associated with the particular content rating;
determine, for each of the previously submitted search queries, whether the number of search results associated with the particular content rating meets a predetermined threshold value; and
in response to determining that the number of search results associated with the particular content rating does not meet the predetermined threshold value for the previously submitted search query, insert the previously submitted search query to the list;
generate, from the group of candidate search suggestions, a modified group of search suggestions by removing one or more search suggestions that are included on the list of search suggestions that have been determined to be disallowed; and
cause a subset of the modified group of search suggestions to be presented on the user device as the remaining portion of the partial search query.

9. The system of claim 8, wherein each candidate search suggestion in the group of candidate search suggestions begins with the one or more characters of the partial search query.

10. The system of claim 8, wherein the hardware processor is further programmed to rank the modified group of search suggestions, wherein the subset of the modified group of search suggestions is determined based on the ranking, and wherein the subset of the modified group of search suggestions is presented based on the ranking.

11. The system of claim 10, wherein the ranking is performed based at least in part on a relevance of search results associated with a search suggestion to a particular demographic.

12. The system of claim 8, wherein the hardware processor is further programmed to:
determine a plurality search queries from the group of previously submitted search queries that are similar;
average the number of search results associated with the particular content rating for each of the plurality of search queries to calculate an updated number of search results; and
in response to determining that the updated number of search results does not meet the predetermined threshold, insert the plurality of search queries to the list.

13. The system of claim 8, wherein the hardware processor is further programmed to:
determine whether each candidate search suggestion is on a second list of not allowed search suggestions, wherein the second list is associated with a user account authenticated on the user device; and
remove search suggestions that are on the second list from the group of candidate search suggestions.

14. The system of claim 8, wherein the hardware processor is further programmed to:
store the number of search results associated with the particular content rating and a safety score based on the number of search results associated with the particular content rating in association with each search query in the list; and
store the list.

15. A non-transitory computer-readable medium containing computer executable instructions that, when executed by a processor, cause the processor to perform a method for providing search suggestions, the method comprising:
receiving user input from a user device that includes one or more characters of a partial search query;
identifying a group of candidate search suggestions corresponding to the one or more characters of the partial search query, wherein each candidate search suggestion is a prediction of a complete search query;
determining whether each candidate search suggestion from the group of candidate search suggestions is included on a list of search suggestions that have been determined to be disallowed, wherein the list is generated by:
receiving previously submitted search queries from user devices other than the user device and a plurality of search results that have been previously retrieved by a search engine in response to each of the previously submitted search queries;
determining, for each of the previously submitted search queries received from the user devices other than the user device, a number of search results retrieved in response to the submitted search query that include content associated with a particular content rating, wherein the particular content rating indicates a suggested age for viewers of content associated with the particular content rating;
determining, for each of the previously submitted search queries, whether the number of search results associated with the particular content rating meets a predetermined threshold value; and
in response to determining that the number of search results associated with the particular content rating does not meet the predetermined threshold value for the previously submitted search query, inserting the previously submitted search query to the list;
generating, from the group of candidate search suggestions, a modified group of search suggestions by removing one or more search suggestions that are included on the list of search suggestions that have been determined to be disallowed; and
causing a subset of the modified group of search suggestions to be presented on the user device as the remaining portion of the partial search query.

16. The non-transitory computer-readable medium of claim 15, wherein each candidate search suggestion in the group of candidate search suggestions begins with the one or more characters of the partial search query.

17. The non-transitory computer-readable medium of claim 15, wherein the method further comprises ranking the modified group of search suggestions, wherein the subset of the modified group of search suggestions is determined based on the ranking, and wherein the subset of the modified group of search suggestions is presented based on the ranking.

18. The non-transitory computer-readable medium of claim 17, wherein the ranking is performed based at least in part on a relevance of search results associated with a search suggestion to a particular demographic.

19. The non-transitory computer-readable medium of claim 15, wherein the method further comprises:
   determining a plurality search queries from the group of previously submitted search queries that are similar;
   averaging the number of search results associated with the particular content rating for each of the plurality of search queries to calculate an updated number of search results; and
   in response to determining that the updated number of search results does not meet the predetermined threshold, inserting the plurality of search queries to the list.

20. The non-transitory computer-readable medium of claim 15, wherein the method further comprises:
   determining whether each candidate search suggestion is on a second list of not allowed search suggestions, wherein the second list is associated with a user account authenticated on the user device; and
   removing search suggestions that are on the second list from the group of candidate search suggestions.

21. The non-transitory computer-readable medium of claim 15, wherein the method further comprises:
   storing the number of search results associated with the particular content rating and a safety score based on the number of search results associated with the particular content rating in association with each search query in the list; and
   storing the list.

* * * * *